April 1, 1969   C. J. ROGERS, SR   3,436,599
ELECTRICAL GROUND FAULT PROTECTIVE CIRCUIT
Filed Sept. 9, 1966

INVENTOR
CHARLES J. ROGERS, SR.

BY *P. Russell Foster*

ATTORNEY

United States Patent Office 3,436,599
Patented Apr. 1, 1969

3,436,599
ELECTRICAL GROUND FAULT PROTECTIVE CIRCUIT
Charles J. Rogers, Sr., Charleston, S.C., assignor to C. J. Rogers Enterprises, Inc., Charleston, S. C., a corporation of South Carolina
Filed Sept. 9, 1966, Ser. No. 578,373
Int. Cl. H02h 1/02, 7/00
U.S. Cl. 317—18
7 Claims

ABSTRACT OF THE DISCLOSURE

An electrical circuit for supplying power to a load connected through a switch and an isolation transformer to a source of electrical power which inclues a grounded circuit connected to the transformer secondary winding through a relay coil for actuating the switch, a half-wave rectifier for reducing the voltage in the grounded circuit to a safe level and a Zener diode for further reducing the voltage in the grounded circuit by a predetermined voltage value.

---

This invention relates to an electrical safety circuit and more particularly to an improved electrical safety circuit for preventing personal injury and property damage in an electrical distribution system. This invention is directed to a novel improvement of the electrical safety circuits described and claimed in U.S. Patent No. 3,229,163, issued Jan. 11, 1966, to C. J. Rogers, Sr., and U.S. Patent No. 3,242,382, issued Mar. 22, 1966, to C. J. Rogers, Sr.

In the aforementioned patents, an electrical safety circuit is provided which utilizes an isolation transformer by means of which a power source is connected to the load in an electrical distribution system with the attendant elimination of the conventional ground wire so as to isolate the load line conductors from the ground. Normally closed switching means are connected between the transformer secondary winding and the load for interrupting the line conductors to disconnect the load. Circuit means for actuating the switching means are also provided which are connected between the transformer secondary winding and ground. The circuit means has a voltage level such that it is non-responsive to the grounding of a line conductor when contacted by the human body so as to prevent actuation of the switching means but permits such actuation upon the occurrence of a low resistance ground fault on a line conductor. In the illustrated embodiments of the inventions of the aforementioned patents, the transformer secondary winding has its center tap connected to ground through a half-wave rectifier so that the voltage level in the circuit means is limited to approximately one-fourth of the voltage across the secondary winding of the transformer. In such an electrical safety circuit, the electrical distribution system remains in operation when contact with a line conductor is made by a person since the low voltage in the grounded circuit provided by the half-wave rectifier coupled with the resistance of the person's body prevents actuation of the switching means. Consequently, there is no risk whatsoever from electrical shock to a person since the grounded circuit is not used under such conditions to disconnect the power source from the load in the manner common to electrical circuit protective devices of the type known today. At the same time, a low resistance ground fault on a line conductor permits the switching means to be actuated even at the low voltage established by the half-wave rectifier to disconnect the load from the power source until the ground fault can be eliminated.

The basic protective circuit of U.S. Patent No. 3,229,-163 provides protection against shock hazard by means of a very low grounded circuit voltage. In a subsequent improvement on the basic electrical safety circuit of U.S. Patent No. 3,229,163 as described and claimed in U.S. Patent No. 3,242,382, a first circuit is provided which includes a normally nonconductive current responsive device such as a silicon controlled rectifier or "SCR" for actuating the switching means to disconnect the load from the source of power. A second circuit which includes a half-wave rectifier is also provided which is grounded in the manner of the circuit of U.S. Patent No. 3,229,163 and which is connected to the silicon controlled rectifier. The maximum current which can flow in the second circuit is limited to the relatively low, activating current level for the SCR which current level is limited to a magnitude considered positively noninjurious to the human body. Thus the circuit of U.S. Patent No. 3,242,382 provides protection against both voltage and current hazards.

Although the electrical safety circuits of the aforementioned patents offer absolute safety from electrical shock to persons coming in contact with line conductors as well as providing ground fault protection, in some instances it may be desirable to reduce the voltage level in the grounded circuit below the voltage level obtainable with the components of the patented circuits. As set forth in the aforementioned patents, the connection of the grounded circuit to the center tap of the isolation transformer together with the half-wave rectifier permits a rectified voltage of approximately 27 volts D.C. when the line voltage across the transformer windings is approximately 120 volts A.C. Since a distribution voltage of 120 volts A.C. is widely used, particularly in residences, and as a result of the inherent electrical characteristics of a half-wave rectifier, the grounded circuit voltage in installations of the patented safety circuit is required to be approximately 27 volts D.C. which voltage level, however, is below the voltage considered positively safe by safety organizations.

Accordingly, a primary object of this invention is to provide a new and novel electrical safety circuit for an electrical distribution system of the type commonly found in residences, shops, buildings and the like which positively prevents property damage and bodily injury.

Another object of this invention is to provide a new and novel electrical safety circuit for an electrical distribution system which is an improvement of the circuits of U.S. Patents No. 3,229,163 and No. 3,242,382 and which permits the voltage in the grounded circuit occurring from a line fault or by contact by a person with a load line to be accurately predetermined and maintained at any desired level below the voltage level established by safety organizations for positive human safety.

A further object of this invention is to provide a new and novel electrical safety circuit for an electrical distribution system which eliminates any hazard to property or persons from both the current and voltage employed in the system.

This invention further contemplates the provision of a new and novel electrical safety circuit for an electrical distribution system which utilizes readily available and inexpensive circuit components which may be of the solid-state type in a simple manner so that a circuit of long life and rugged construction is obtained and which may be compacted in a minimum of space while operating positively to eliminate electrical shock hazards while being readily responsive for positive protection against ground faults on the system.

Still another object of this invention is to provide a new and novel electrical safety circuit for an electrical distribution system which permits the voltage to which a person is exposed by contact with a line conductor to be easily predetermined by selection and/or arrangement of circuit components, the range of such predetermined voltage extending from below the level considered positively safe by safety organizations and lower regardless of the magnitude of the voltage of the power source with which the safety circuit is associated.

Other objects and advantages of the invention will become apparent from the following description taken in connection with the accompanying drawing.

In general, the objects of the invention and related objects are accomplished by providing a transformer having a primary winding arranged to be connected to a source of electrical power. The secondary winding of the transformer is arranged to be connected by means of line conductors to a load and normally closed switching means are provided for disconnecting the load from the source of power. Circuit means are provided which are connected between the transformer secondary winding and ground for actuating the switching means upon the occurrence of a low resistance ground fault in one of the line conductors to disconnect the load from the source of power. The voltage in the circuit means is at a level such that the circuit means is non-responsive to a fault produced by the grounding of one of the line conductors by a human body to prevent actuation of the switching means. In the instant invention, the circuit means comprises electronic valve means normally nonconductive below a predetermined voltage value. The electronic valve means is conductive at the predetermined voltage value and maintains this voltage value constant independent of the magnitude of the current in the circuit means to thereby selectively reduce the voltage level in the circuit means by a predetermined amount corresponding to this predetermined voltage value.

The novel features which are believed to be characteristic of the invention are set forth with particularity in the appended claims. The invention itself, however, both as to its organization and method of operation may be best understood by reference to the following description taken in conjunction with the accompanying drawing in which:

Figure 1:
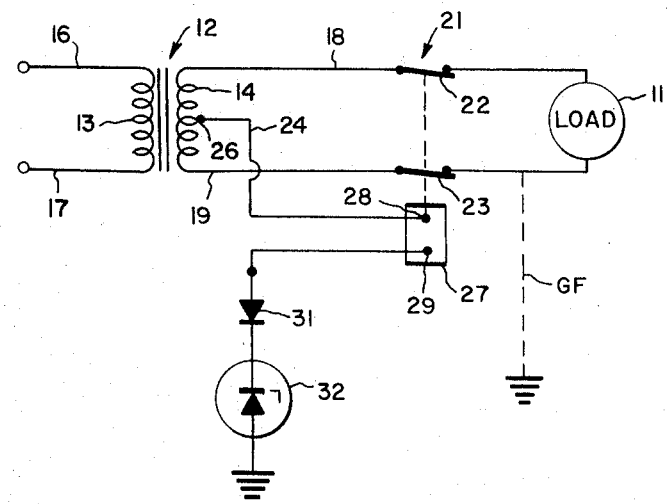
FIGURE 1 is a schematic wiring diagram illustrating the electrical safety circuit of the invention.

Referring now to the drawing and to FIGURE 1 in particular, there is shown a safety circuit constructed in accordance with the invention which is an improvement of the circuit described and claimed in the aforesaid U.S. Patent 3,229,163. As in the invention of the aforesaid patent, the electrical safety circuit of this invention is arranged to supply a load 11 such as lighting, appliances or a motor with electrical power from a suitable source (not shown).

In order to connect the load 11 to the source of power, an isolation transformer designated generally by the numeral 12 is provided and the transformer 12 is of the conventional type having a primary winding 13 and a secondary winding 14. The primary winding 13 of the transformer 12 is arranged to be connected at its ends by means of conductors 16, 17 to a suitable source of power (not shown). In the illustrated embodiment, the transformer 12 is of the type which provides a 1:1 ratio so as to provide the same voltage across the transformer secondary winding 14 as the line voltage applied across the transformer primary winding 13.

As the circuit of the invention is particularly adaptable for use in residences, shops, buildings, etc., where the source of power is at a voltage of approximately 120 volts A.C., the voltage across both transformer windings 13, 14 in such an installation is approximately 120 volts A.C. The ends of the transformer secondary winding 14 are connected by means of line conductors 18, 19 to the motor or load 11 through normally closed switching means designated generally by the numeral 21. Switching means 21 includes a pair of gang operated switches 22, 23 which are normally urged into the closed position to connect the associated source of power from the transformer secondary winding 14 to the load 11.

Circuit means are provided which are connected between the transformer secondary winding 14 and ground for actuating the switching means 21 upon the occurrence of a low resistance ground fault in one of the line conductors to interrupt the line conductors 18, 19 and disconnect the load 11 from the source of power. More specifically, conductor 24 is provided which is connected at one end to the transformer secondary winding 14 preferably at a center tap 26 and at its other end to ground as shown in FIGURE 1. The circuit means include a relay coil 27 operatively associated with the switching means 21. The relay coil 27 is provided with terminals 28, 29 to which the conductor 24 is serially connected.

As described and claimed in the aforementioned U.S. Patent No. 3,229,163, a half-wave rectifier 31 is connected to the conductor 24 in series relationship with the coil 27 for providing a voltage having a magnitude of approximately one-half of the voltage obtained at the transformer secondary winding center tap 26. Thus, if the voltage applied to the primary winding 13 of the transformer 12 from conductors 16, 17 is approximately 120 volts A.C., the voltage obtained at the transformer secondary winding center tap 26 is approximately 60 volts being one-half of the voltage across transformer primary and secondary windings 13, 14 respectively. With the use of the half-wave rectifier 31, the voltage impressed on the coil 27, now D.C. as a result of rectification, is approximately one half of the transformer secondary winding center tap voltage of 60 volts or a voltage of approximately 27 volts D.C. By means of the half-wave rectifier 31 and the resulting relatively low voltage of approximately 27 volts D.C., the circuit means is non-responsive to a fault produced by the grounding of one of the line conductors by the human body thereby preventing actuation of the switching means 21.

As generally illustrative of the invention, the circuit means of the invention includes electronic valve means normally nonconductive below a predetermined voltage value and being conductive at this predetermined voltage value to maintain said voltage value constant independent of the magnitude of the current in the circuit means to thereby selectively reduce the voltage level in the circuit means by a predetermined amount corresponding to the predetermined voltage value. More specifically, a Zener diode 32 having a predetermined voltage rating or value, this value being referred to as the "breakdown voltage," is connected to the conductor 24 in series relationship with the half-wave rectifier 31 and the relay coil 27 as shown in FIGURE 1.

As is well known, the Zener diode is a solid-state electronic device frequently referred to as an "avalanche" or "breakdown" diode which is nonconductive at voltages below its predetermined breakdown voltage in the reverse direction. When the voltage across a Zener diode increases to approximately its breakdown voltage, the Zener diode becomes conductive and this voltage remains approximately constant independent of the magnitude of current flow through the diode. In the instant invention, this characteristic of the Zener diode is utilized by selecting a Zener diode 32 having a breakdown voltage corresponding to the voltage reduction required to provide the desired voltage level in the circuit means of the embodiment of FIGURE 1 as will be explained hereinafter.

In the illustrated embodiment of FIGURE 1, the Zener diode 32 is connected in opposed relationship to the rectifier 31 whereby the resulting voltage half-wave produced by the rectifier 31 is applied in the reverse direction of the Zener diode 32. As the half-wave rectifier 31 eliminates the other voltage half-wave, there is no half-wave to which the Zener diode must respond in its forward direction.

As is well known, the prevention of damage to the semiconductor Zener diode 32 requires the presence of suitable resistance in the circuit which includes the Zener diode. This resistance is provided by the coil 27 which limits the maximum current flowing through the Zener diode 32 thereby avoiding any injurious effects to the diode which might occur from high current flow.

In the operation of the embodiment of FIGURE 1, power is supplied to the load 11 from the associated source of power through the conductors 16, 17, the isolation transformer 12, the line conductors 18, 19, and the normally closed switching means 21. Upon the occurrence of a low resistance ground on one of the line conductors 18, 19, such as has been schematically illustrated in FIGURE 1 by the reference character GF and as will occur from contact by a bare portion of one of the line conductors with ground or a short in the windings of the motor load 11 assuming the motor frame is in contact with the ground, a circuit is immediately established through conductor 24 and ground.

This grounded circuit is a low voltage circuit as a result of the rectified D.C. voltage produced by the half-wave rectifier 31 and the presence of the Zener diode 32 in the circuit, which further reduces the voltage in the grounded circuit. For instance, if the Zener diode 32 has a breakdown voltage of 10 volts in the reverse direction the maximum voltage which would be present in the grounded circuit would be 22 volts. This voltage level of 22 volts D.C. in the grounded circuit including conductor 24 results when the Zener diode becomes conductive its breakdown voltage of 10 volts having been reached. Since only one side of the Zener diode (the reverse direction) is effective, the rectified voltage of 27 volts is reduced by 5 volts, i.e., one half (½) of the Zener diode breakdown voltage of 10 volts to provide a resulting voltage in the circuit means of 22 volts.

As has been previously explained, the relay coil 27 prevents the build up of the avalanche current in conductor 24 such as would normally occur at the breakdown voltage of the Zener diode 32. When the Zener diode conducts at the breakdown voltage of 10 volts with the voltage level in conductor 24 at 22 volts D.C., current flows in conductor 24 as a result of the low resistance ground fault GF energizing relay coil 27 and actuating switching means 21 to move the switches 22, 23 to the open position interrupting the line conductors 18, 19 and disconnecting the load 11 from the source of power.

If one of the line conductors 18, 19 is contacted by the body of a person or if a person touches the frame of the motor 11 which is ungrounded but wherein the motor winding has become shorted to the frame, there is very little, if any, flow of current through the person's body due to the high body resistance and the low voltage of only 22 volts D.C. in the circuit of conductor 24. Thus relay coil 27 does not actuate the switching means 21 and the switches 22, 23 remain in the closed position. In this way, injury or death from electrical shock to a person contacting the line conductors 18, 19 in the system cannot occur. In the same manner, where lower voltages in the circuit including conductor 24 are desired, Zener diodes 32 of higher breakdown voltage ratings may be selected.

Figure 2:
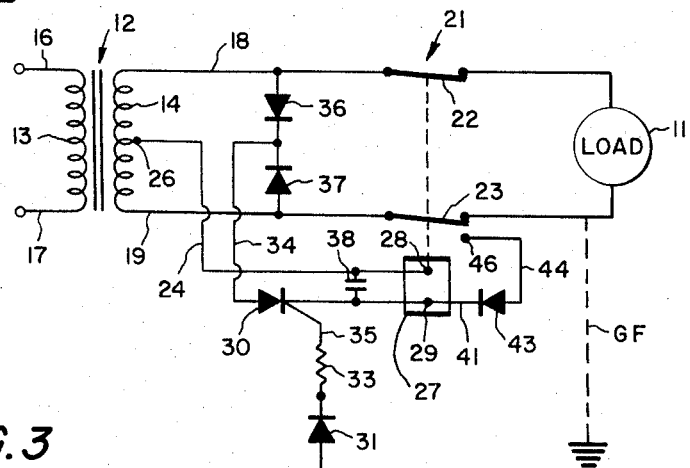
FIGURE 2 is a modification of the electrical safety circuit of FIGURE 1.

FIGURE 2 shows a modification of the invention which incorporates with this invention some of the features of the aforementioned U.S. Patent No. 3,242,382. In the embodiment of FIGURE 2, like numerals are used to identify like parts. As in the previous embodiment, isolation transformer 12 has its primary coil 13 connected by means of conductors 16, 17 to an associated source of power and the secondary winding 14 of the transformer 12 provided with a center tap 26 is connected by means of line conductors 18, 19 through switching means 21 to the load 11.

In the embodiment of FIGURE 2, first circuit means are provided which includes relay coil 27 associated with switching means 21 having switches 22, 23 and relay coil 27 is provided with contact 28 connected by means of conductor 24 to the transformer center tap 26. The other terminal 29 of relay coil 27 is connected to a silicon controlled rectifier 30 or "SCR" by means of conductor 34, the other end of which is connected by means of diodes 36, 37 to line conductors 18, 19 respectively. As described in the aforementioned U.S. Patent No. 3,242,382, the SCR 30 is normally nonconductive and the current magnitude at which SCR 30 becomes conductive is an amperage substantially less than the predetermined amperage in the first circuit means required to energize relay 27 and actuate the switching means 21. More specifically, the amperage at which the SCR 30 becomes conductive is limited to a magnitude considered positively noninjurious to the human body.

Second circuit means are also provided as described in the aforementioned U.S. Patent No. 3,242,382 which are normally nonresponsive to a fault produced by the grounding of one of the line conductors 18, 19 by the human body. This second circuit means is arranged to conduct upon the occurrence of a low resistance ground fault on one of the line conductors, such ground fault being designated in FIGURE 2 by the reference character GF, to operatively condition the normally inoperative first circuit means at an amperage which is substantially below the predetermined amperage of the first circuit means. More specifically, grounded conductor 35 is connected at one end to the SCR 30 and is connected in series relationship to a current limiting resistor 33, a half-wave rectifier 31, and a Zener diode 32.

As has been previously explained, the half-wave rectifier 31 produced a voltage of approximately 27 volts D.C. in the grounded circuit and in conjunction with the Zener diode 32, which, by way of example, may have a reverse breakdown voltage of 10 volts, the voltage level in the grounded circuit in the presence of a line fault GF would be 22 volts substantially below the voltage level of 30 volts considered by safety organizations as positively non-injurious to the human body. The current limiting resistor 33 not only increases the resistance in a grounded circuit produced by a human body which contacts one of the line conductors 18, 19 but limits the maximum possible current in a ground fault circuit as well as providing protection for the semiconductor Zener diode 32 from a high avalanche current.

As described and claimed in the aforementioned U.S. Patent No. 3,242,382, a low resistance ground fault GF on one of the line conductors 18, 19 produces a grounded circuit through conductor 35 including rectifier 31 and Zener diode 32 at a voltage level of only 22 volts D.C. The SCR 30 which may be designed to respond to approximately 2⅓ milliamperes of current flowing in the second circuit means and which is normally nonconductive, responds as soon as this current magnitude is reached so that current flows in conductor 34 at a predetermined amperage, which is preferably approximately 80 milliamperes so as to energize relay coil 27. Upon energization of relay coil 27, switching means 21 is actuated to interrupt line conductors 18, 19 to disconnect the load 11 from the associated source of power.

If one of the line conductors 18, 19 is contacted by the body of a person, there is virtually no flow of current through this person's body due to the high body resistance as explained previously and the low voltage level in the grounded circuit of only 22 volts which is far below the voltage level established by safety organizations as positively noninjurious to the human body. Therefore, no actuation of switching means 21 occurs and the load 11 remains connected to the source of power. At the same time, all shock hazard from both voltage and current has been eliminated.

Figure 3:
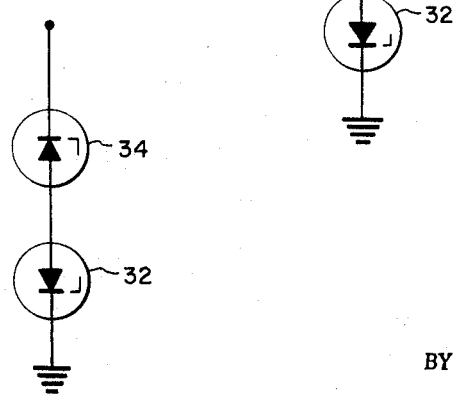
FIGURE 3 is a modification of the electrical safety circuits of FIGURES 1, 2.

FIGURE 3 is a modification of the circuits of FIGURES 1, 2 wherein like numerals are used to identify like parts and wherein the conductor from Zener diode 34 may be connected to relay coil terminal 29 in FIGURE 1 or resistor 33 in FIGURE 2. In the embodiment of FIGURE 3, the rectifier 31 of the embodiments of FIGURES 1, 2 is replaced by a second Zener diode 34 which is arranged in back-to-back relationship with the Zener diode 32. With particular reference to the circuit of FIGURE 1, as a result of the omission of rectifier 31 from the circuit of FIGURE 3, an A.C. voltage of approximately 60 volts appears in the grounded circuit which includes conductor 24 but the back-to-back relationship of the Zener diodes 32, 34 limits the peak voltage in this grounded circuit in accordance with the selected breakdown voltage ratings of the diodes 32, 34. Only the modification to the circuits of FIGURES 1, 2 is shown in FIGURE 3, the connection to these circuits being indicated generally by the single solid dot.

By way of example, with Zener diodes 32, 34 of substantially the same breakdown voltage of 10 volts, one of the diodes 32, 34 will be forward biased with a voltage drop of approximately 0.5 volt and the other reversed biased with a voltage drop equal to the 30 volt breakdown voltage rating of the Zener diodes regardless of the polarity of the A.C. voltage across the two diodes 32, 34 in series. Therefore, the two diodes 32, 34 will conduct when the voltage across the two diodes in series exceeds 30.5 volts and will not conduct for voltages below this level. When the Zener diodes 32, 34 conduct, such as upon the occurrence of a low resistance ground fault GF, the voltage in the circuit means will be reduced by 30.5 volts. In other words, with a voltage at the transformer secondary winding of 60 volts, the voltage in the circuit means will be 29.5 volts. At the same time, due to this low voltage, the grounded circuit will be nonconductive or nonresponsive to contact with one of the line conductors 18, 19 by a human body as in the embodiments of FIGURES 1, 2.

It can be seen with the novel arrangement of the circuits of the invention that complete protection is provided against personal injury and property damage in an electrical distribution system as a result of the limiting of voltage and/or current levels in the grounded circuit of the invention to levels considered positively noninjurious to the human body by safety organizations. At the same time, the maximum voltage in the grounded circuit may be predetermined by the simple selection of an inexpensive, commerically available solid-state circuit component of the appropriate rating. This inexpensive, readily available circuit component known as a "breakdown" diode or Zener diode permits the grounded circuit voltage level to be reduced by a value corresponding to its breakdown value so that the resulting voltage in the grounded circuit may be precisely determined in accordance with the particular application with which the circuit of the invention is employed.

An outstandng feature of the use of a Zener diode in the circuit of the invention is the ability of the Zener diode to reduce the voltage level in the grounded circuit appropriately from the rectified voltage level produced by a half-wave rectifier in the manner described and claimed in the aforementioned patents. On the other hand, the novel circuit of the invention permits the use of a pair of Zener diodes in back-to-back relationship without the half-wave rectifier to accomplish the same purpose but in a different manner from the circuit arrangement incorporating the half-wave rectifier. Zener diodes within a wide range of power capacity and breakdown voltage ratings are available today so that the unlimited variety of electrical distribution systems and attendant prescribed grounded circuit voltages may have incorporated therewith the circuit of the invention with the grounded circuit voltage maintained at the desired level. This grounded circuit voltage level may be maintained regardless of the source voltage as the rating of Zener diode or diodes employed may be selected accordingly to produce the desired resulting voltage.

While there has been dsecribed what at present is considered to be the preferred embodiment of the invention, it will be understood by those skilled in the art that various changes and modifications may be made without departing from the invention and, therefore, it is the aim of the appended claims to cover all such changes and modifications as fall within the true spirit and scope of the invention.

Having thus described the invention, what is claimed is:

1. In an electrical safety circuit of the type which includes a transformer having a primary winding arranged to be connected to a source of electrical power and a secondary winding arranged to be connected by means of line conductors to a load, normally closed switching means for disconnecting said load from said source of power, circuit means connected between said transformer secondary winding and ground for actuating said switching means upon the occurrence of a low resistance ground fault in one of said line conductors to disconnect said load from said source of power, said circuit means being nonresponsive to a fault produced by the grounding of one of said line conductors by the human body to prevent actuation of said switching means, the improvement which comprises electronic valve means in said circuit means, said electronic valve means being normally nonconductive below a predetermined voltage value, said electronic valve means being conductive at said predetermined voltage value and arranged to maintain said voltage value constant independent of the magnitude of the current in said circuit means to thereby selectively reduce the voltage level in said circuit means by a predetermined amount corresponding to said predetermined voltage value.

2. An electrical safety circuit in accordance with claim 1 wherein said electronic valve means comprises at least one Zener diode, said Zener diode having a selected breakdown voltage corresponding to said predetermined voltage value.

3. An electrical safety circuit in accordance with claim 1 wherein said electronic valve means comprises a half-wave rectifier and a Zener diode in serially connected relationship therewith whereby the rectified voltage in said circuit means is reduced by a value corresponding to the selected breakdown voltage of said Zener diode.

4. An electrical safety circuit in accordance with claim 3 wherein said Zener diode is serially connected in opposed relationship with said half-wave rectifier and wherein said Zener diode is arranged to reduce the rectified voltage in said circuit means by a value equal to substantially one half of the selected breakdown voltage of said Zener diode.

5. An electrical safety circuit in accordance with claim 1 wherein said electronic valve means comprises a pair of Zener diodes in serially connected back-to-back relationship whereby the voltage in said circuit means in either direction is reduced by a predetermined amount corresponding to the breakdown voltage ratings of said Zener diodes.

6. An electrical safety circuit in accordance with claim 1 wherein said circuit means is connected between the center tap of said transformer secondary winding and ground and includes a coil operatively associated with said switching means in said circuit means, a half-wave rectifier serially connected with said coil, a Zener diode in serially connected reversed relationship with said half-wave rectifier, whereby the rectified voltage in said circuit means is reduced by a value equal to substantially one half of the selected breakdown voltage of said Zener diode, said coil being arranged to actuate said switching means upon the occurrence of a low resistance ground fault in one of said line conductors to interrupt said line conductors and disconnect said load and said coil being non-responsive to a fault produced by the grounding of one of said line conductors by the human body to thereby prevent actuation of said switching means.

7. An electrical safety circuit in accordance with claim 1 wherein said circuit means includes a normally inoperative first circuit means connected to said transformer secondary winding for actuating said switching means at a predetermined amperage, said first circuit means including a normally open silicon controlled rectifier, said silicon controlled rectifier being arranged to close in response to a current which is positively noninjurious to the human body and operatively condition said first circuit means, second circuit means connected between said silicon controlled rectifier ground for applying current to said silicon controlled rectifier, said second circuit means including a half-wave rectifier and a Zener diode in serially connected reversed relationship therewith, said Zener diode being arranged to reduce the rectified voltage in said second circuit means by a value corresponding to the selected breakdown voltage of said Zener diode to thereby further limit the voltage in said second circuit means to a magnitude which is positively noninjurious to the human body and at which said second circuit means is nonresponsive to a fault produced by the grounding of one of said line conductors by the human body, said second circuit means being arranged to conduct upon the presence of a low resistance ground fault on one of said line conductors and apply said noninjurious current to said silicon controlled rectifier whereby said silicon controlled rectifier closes and operatively conditions said first circuit means to actuate said switching means and disconnect said load from said source of power.

References Cited

UNITED STATES PATENTS

| | | | |
|---|---|---|---|
| 2,844,765 | 7/1958 | Sosnoski | 317—18 |
| 3,018,356 | 1/1962 | Busch et al. | 317—33 X |
| 3,213,323 | 10/1965 | Circle | 317—33 |
| 3,229,163 | 1/1966 | Rogers | 317—18 |
| 3,242,382 | 3/1966 | Rogers | 317—18 |
| 3,287,603 | 11/1966 | Sosnoski | 317—18 |

JOHN F. COUCH, *Primary Examiner.*

R. V. LUPO, *Assistant Examiner.*

U.S. Cl. X.R.

317—33